UNITED STATES PATENT OFFICE.

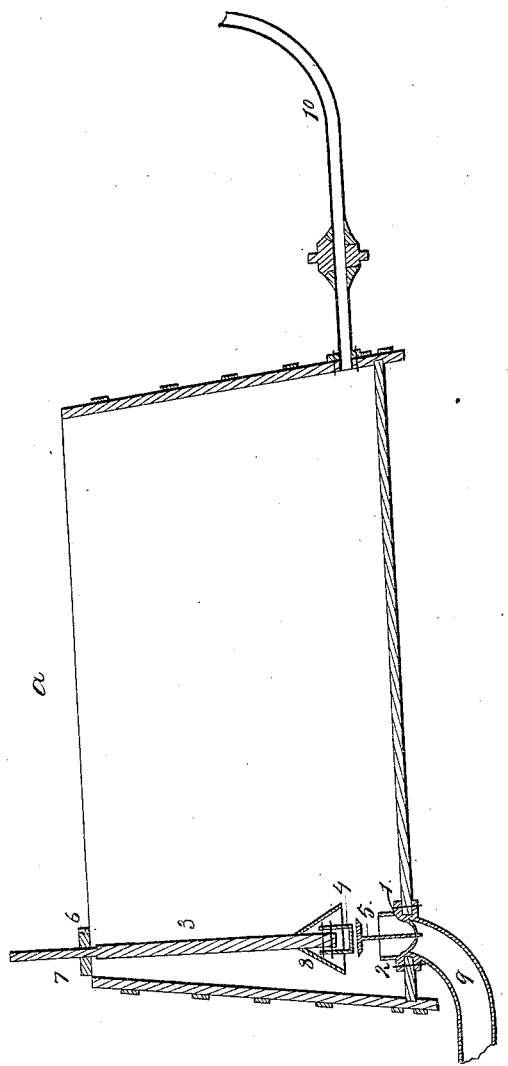

DAVIS EMBREE, OF DAYTON, OHIO.

IMPROVED METHOD OF REMOVING INCRUSTATION FROM BOILERS.

Specification forming part of Letters Patent No. 45,914, dated January 17, 1865.

*To all whom it may concern:*

Be it known that I, DAVIS EMBREE, of Dayton, in the county of Montgomery and State of Ohio, have invented an Improved Method of Removing Incrustation from Boilers, of which the following is a specification.

The groundwork of my invention, or rather application, I conceive to be founded on sound chemical principles—that lime is the base of all incrustation in steam-boilers; that it is generally found to be carbonate of lime or limestone; that it assumes the form of crystals; that it is insoluble in water; that particles of the same kind, in the formation of crystals, unite with each other, adding to the mass first formed or fixed. Incrustation of boilers may be dissolved by an acid which has a stronger affinity to lime than carbonic acid has. The lime and such acid will unite, generally forming a compound that is soluble and cannot coat a boiler, while the carbon passes off in form of carbonic acid gas. Incrustation can also be removed by an alkali that has a stronger affinity for carbonic acid than lime has. Such alkali, uniting with the carbonic acid, leaves the lime in a pure state, which is soluble in a sufficient quantity of water, and cannot coat a boiler. The compound of such alkali with the carbon will also generally be found soluble.

To prevent incrustation in steam-boilers, one other mode may be resorted to—that of thoroughly boiling the water before it enters the steam-boilers. These are the only known means to accomplish the object desired.

There are but few persons aware of the exact condition in which lime is held in solution in what is called "hard water." It is not carbonate of lime, for that is insoluble, and the assuming that form causes all the difficulty. We must, therefore, look to some other combination, for every new combination of chemical atoms has different results, and these atoms, according to late chemical authority, unite in definite proportions, and not otherwise; hence, one atom of lime united with one atom of carbonic acid will form carbonate of lime, (insoluble.) If one atom of lime unite with two atoms of carbonic acid it will be supercarbonate of lime, a substance that is soluble, and which we contend is the true condition of lime in what is called "hard water." Limestone is carbonate of lime. By being burned in a limekiln it is deprived of its carbon and its water of crystallization, and becomes quicklime. It then seizes upon a certain quantity of water or carbonic acid, wherever it may come in contact with them, or either of them. Now, to take a small quantity of quicklime, either dissolved in water or otherwise, and put it in common hard water, it will immediately seize upon the surplus carbon of the supercarbonate of lime and reduce all the lime in the water to carbonate of lime, which will be insoluble, and will immediately fall to the bottom of the vessel, leaving the water pure as water can be; hence the impossibility of it coating a boiler. It only requires two tanks or tubs for water, as represented in the accompanying drawings, that one may be settled while the other is filled; or, if the engine be supplied from a well, and worked only in the daytime, the lime may be put into the well itself of an evening, and it will be settled before morning. The quantity of lime proper to be used can be tested by litmus-paper. If there be a small surplus quantity of lime it cannot injure the boiler.

In the drawings, A is a tub or tank, ten feet in diameter, five feet high, made of two-inch plank; 1, valve-seat, six inches opening in the clear, with one-fourth inch bearing, the body of the valve six and one half inches in diameter; 2, a pipe surrounding the valve, seven inches in diameter in the clear and four inches high from the bottom of the tub; 3, a wooden rod to raise the valve; 4, an iron plate fastened to the rod, through which the valve-stem passes and plays loosely, having a short pin through it, by means of which the valve is raised; 5, the valve-stem, of sufficient length to remain in the guide below the valve-seat when the valve is raised; 6, a plank, eight inches wide and two inches thick, placed on the top of the tub as a guide for the rod; 7, a pin passed through the rod above the plank, so as to hold up the valve when four inches above the top of the pipe; 8, a cap fastened on the rod, eight inches in diameter, to cover and close the pipe when the valve is seated; 9, a pipe, six inches in diameter in the clear, to convey water to the tank of a locomotive engine; 10, a pipe, two inches in diameter, placed four inches above the bottom of the tub, with a proper gage-cock, to convey water to the force-pump of a stationary engine.

To remove incrustations in a steam-boiler I have chosen stillslop, an article not heretofore used. It costs but little, and contains a large quantity of vegetable acid, which is not severe on iron.

I do not claim the discovery of any new chemical principle. I have long been aware that vegetable acids would decompose carbonate of lime. I am also aware that quicklime has been used to break what is called "hard water"; but I do claim the right to use or employ known materials for a purpose which is new and useful, when such appliance has never been authorized, patented, known, or published.

What, therefore, I desire to secure by Letters Patent is—

The use of stillslop to prevent or remove incrustation by lime in steam-boilers, and the use of quicklime, in the manner herein substantially set forth, to prevent such incrustations.

DAVIS EMBREE.

In presence of—
WARREN MUNGER, Jr.,
QUINCY CORWIN.